Feb. 15, 1927.
N. H. GAY
1,617,630
PROCESS OF PRECOOLING FRUITS AND VEGETABLES AND OTHER PERISHABLE
COMMODITIES FOR SHIPMENT
Filed Sept. 17, 1923
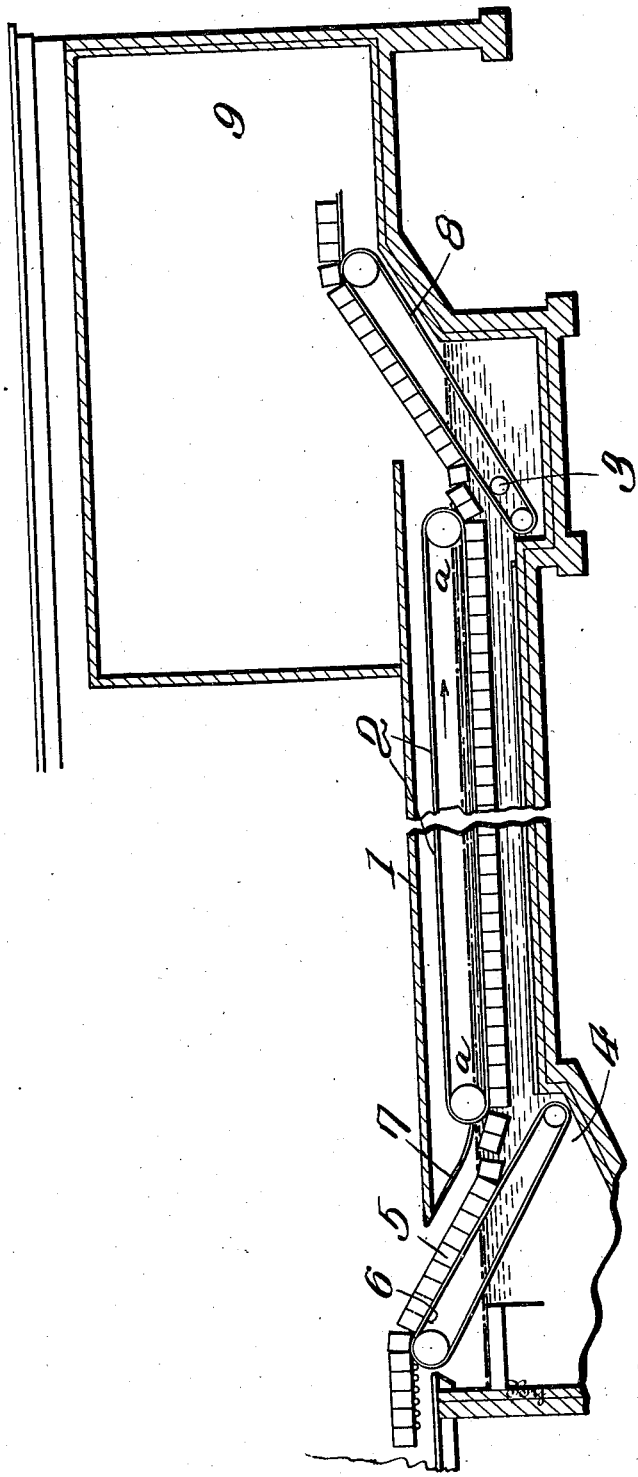
Inventor
Norman H. Gay
By Sturtevant + Mann
Attorney Patented Feb. 15, 1927.

1,617,630

UNITED STATES PATENT OFFICE.

NORMAN HENRY GAY, OF LOS ANGELES, CALIFORNIA.

PROCESS OF PRECOOLING FRUITS AND VEGETABLES AND OTHER PERISHABLE COMMODITIES FOR SHIPMENT.

Application filed September 17, 1923. Serial No. 663,176.

The invention relates to new and useful improvements in a process of preparing perishable produce, such as cantaloupes, lettuce or the like for shipment.

An object of the invention is to provide a process of preparing the produce for shipment whereby said produce can be allowed to thoroughly mature on its stump before picking, or ripen on the vine without any liability of decaying or perishing during shipment, even though the period between picking and the delivery of the edible to the markets may be a considerable length of time.

A further object of the invention is to provide a method of pre-cooling the produce so that it may be allowed to thoroughly mature or ripen before it is picked and can be thoroughly pre-cooled or chilled all the way through in a very short period of time and before any possible chance of harmful decay setting in.

These and other objects will in part be obvious and will in part be hereinafter more fully disclosed.

In the drawing, I have shown more or less diagrammatically one form of apparatus for carrying out my improved process.

It is well known that cantaloupes and similar edibles are very much better if allowed to fully mature upon the vine before they are picked, and also that a vine-ripened fruit will perish or decay very much more rapidly than a green fruit.

It is also well known that vegetables, such as lettuce or the like, which are fully matured before they are picked, will begin to decay or perish within a very short period from the heat which remains within the produce.

The invention consists broadly in pre-cooling the cantaloupe or the lettuce or whatever vegetable is to be shipped immediately after it is picked and in as short an interval as possible, and packing said produce in refrigerating chambers for shipment while it is still chilled through and through. In carrying out the invention, the produce as soon as possible after it is picked, is submerged in ice-cold water, preferably of a temperature of approximately thirty-four degrees. The produce is wholly submerged in the water and is maintained submerged until all of the growing heat is removed from the product and the same is fully chilled to the center thereof. It is then immediately stored in a refrigerating chamber or packed for shipment in refrigerator cars and before said chilled produce has had time to become heated to any appreciable extent.

Possibly the process will be better understood from a brief reference to the drawing which shows one form of apparatus for carrying out the invention. I will describe the invention first as applied to the pre-cooling of cantaloupes for shipment. The cantaloupes are allowed to fully ripen on the vine. After they are picked they are immediately put through my improved process of pre-cooling. If the pre-cooling station is at some little distance from the field, then the ripened fruit as it is picked is immediately rushed by suitable conveyances to the pre-cooling station. The ripened fruit is put in suitable crates for pre-cooling, and may, if desired, be packed for shipment in crates prior to pre-cooling. The essential thing is that the crates be sufficiently open so that the cooling fluid comes in contact with the entire surface of the cantaloupe.

As shown in the drawings, my pre-cooling apparatus consists of a tank 1 in which is located an endless conveyor 2 which travels so as to move the produce continuously through the cooling water. The level of the cooling water is indicated by the line a—a. I prefer to use in most instances, pure water, although it will be understood, of course, that other forms of cooling solutions may be used.

The temperature of the cooling water is reduced by suitable brine pipes, or the like to a temperature around thirty-four degrees, at which temperature the water will not freeze and can be freely circulated. The water is entered through an inlet pipe 3, and passes to the outlet 4 at the other end of the tank. The conveyor moves in the direction of the arrow so that the crates carrying the melons to be cooled move in a direction opposed to the direction of the cooling water.

I may in some instances, cool the water with ice, where refrigerating coils are not readily available. I may also put sodium chloride in the water so that the temperature of the water can be reduced to thirty degrees or even twenty-six degrees for certain kinds of fruits or vegetables. It is well known that a cantaloupe will stand thirty degrees in cooling; oranges will stand something like twenty-eight degrees temperature, and other fruits or vegetables will stand as low as twenty-six degrees.

The essential thing is to get the temperature of the water as low as possible for a particular fruit or vegetable being cooled, so that said fruit or vegetable may be cooled quickly to the lowest temperature which it can stand without injury.

The crates in which the cantaloupes are packed are indicated at 5. They are placed in the endless conveyor 6 which stands at the incline to the surface of the cooling water, and will carry the crates down into the water. An inclined apron 7 will direct the grates underneath the conveyor 2. The lower run of the conveyor 2 is slightly below the surface of the cooling water, so that the crates which tend to float will be held beneath the water by the conveyor 2 and will be moved through the cooling tank by said conveyor. At the other end of the tank there is an inclined conveyor 8 which receives the crates and carries them up out of the cooling water and into a chamber 9 which is kept at a temperature of forty degrees or below, so as to maintain the fruit or vegetables which has passed through the cooling water in chilled condition, until it can be placed in a refrigerating car.

The cooling water which entirely surrounds the cantaloupes will quickly chill the cantoloupe clear through to the center thereof. This will, of course, cause the ripening process of the cantaloupe to cease and will prevent decay setting in. One of the great troubles experienced in the present methods of pre-cooling, consists in the fact that such a length of time elapses before the vine heat can be entirely removed from the cantaloupe clear through to the center thereof, that it develops a condition wherein decay will readily set in, but by my improved method, the pre-cooling is quickly done and almost immediately after the cantaloupe is picked from the vine, so that the ripening process is stopped at once and held from progressing until the fruit is packed in refrigerating cars for shipment, and in fact, until it reaches its destination where it is to be marketed.

In connection with cantaloupes, it is often desirable to dry the cantaloupe so as to prevent the same from souring or decaying where the surface is broken by picking or the like, and after the cantaloupe is brought from beneath the surface of the cooling water, it may be subjected to dehydration in the chamber which is kept at a relatively low temperature so that the cantaloupe will be thoroughly dried without materially changing its chilled condition clear through to the center thereof. The essential thing is that it shall be maintained in this chilled condition until it is packed in the refrigerating cars for shipment.

In connection with the shipment of lettuce, the heads of lettuce after they are cut from the stump, are conveyed at once to the pre-cooling station where my improved process can be carried out. The heads of lettuce are packed in crates for shipment, which may be done in the field or at the pre-cooling station, but this is done as soon as possible after the lettuce is cut. It may be trimmed if desired, before it is packed. The crates containing the lettuce are put through my improved cooling process, which will cause the heads to be thoroughly cooled clear through to the center thereof. Under all present methods of cooling, where the lettuce is packed in crates, it is almost impossible to cool the heads of lettuce down in the center of the crate, or to cool the lettuce clear through to the extreme center of the head. But, by my improved method of submerging the lettuce in the water which comes in contact with each head of lettuce, said head is thoroughly chilled clear through to the center thereof, and while chilled, it is packed in refrigerating cars for shipment, so that the head of lettuce has all the growing heat taken therefrom almost immediately and all heat is kept out of the head of lettuce until it is ready to put on the market.

The removing of the heat is done very quickly through my process so that there is no chance for the portions of the lettuce well toward the center of the head from deteriorating before it is properly chilled for shipment. In connection with certain fruits, I may also put into the cooling solution, benzoate of soda, or other chemicals for disinfecting and retarding the bacteria growth. This disinfectant will be used in different quantities, depending upon the commodities being cooled.

It will be noted that the products being cooled pass continuously through the cooling water and the cooling water is continuously being changed. As a result, I have a process which may be operated continuously, and therefore, large quantities of produce can be pre-cooled and a number of cars quickly packed. Therefore, the filling of the car and the closing of the car may be quickly brought about as well as the handling of the pre-cooled products, and this all tends to maintain the produce in this chilled condition until it is packed for shipment.

Of course, it will be understood that various other ways can be utilized for pre-cooling the fruits and vegetables from that above described. The essential feature consists in the picking of the vine-ripened product and the retarding of the decay immediately upon the gathering of the fruit from the field by the submerging of the same in a cooling fluid of a character which will cool the product very quickly and then the packing of the product in a refrigerating car immediately after it is chilled, and while it is still chilled for shipment.

While I have described my process as applied to the pre-cooling of cantaloupes and lettuce, it will be understood of course, that it may be used in connection with other commodities, and the present description has been in a large part for the purpose of describing one application of my improvement.

Having thus described the invention, what I claim as new and desire to secure by Letters-Patent, is—

1. The process of preparing fruit or the like for shipment comprising picking fruit after it has fully ripened on the vine, immediately submerging the said fruit in a cooling fluid, maintaining said fruit immersed until the vine heat is removed therefrom and the fruit is thoroughly chilled to the center thereof and without freezing the same, and then immediately placing said fruit while chilled in a refrigerating compartment for shipment.

2. The process of preparing fruits for shipment comprising picking the fruit after it is fully ripened on the vine, immediately submerging the fruit in a cooling fluid at a temperature approximately thirty-four degrees Fahrenheit, maintaining said fruit submerged in said cooling fluid until the vine heat is removed therefrom and the fruit is thoroughly chilled to the center thereof, quickly drying the surface of the fruit without changing appreciably its chilled condition, and placing said fruit while chilled into a refrigerating compartment.

In testimony whereof, I affix my signature.

NORMAN HENRY GAY.